US009768440B2

(12) United States Patent
Ku et al.

(10) Patent No.: US 9,768,440 B2
(45) Date of Patent: Sep. 19, 2017

(54) METHOD OF MANUFACTURING ELECTRODE ASSEMBLY

(71) Applicant: LG CHEM, LTD., Seoul (KR)

(72) Inventors: Dae Geun Ku, Daejeon (KR); Hyuk Su Kim, Daejeon (KR); Jun Woo Huh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 147 days.

(21) Appl. No.: 14/417,910

(22) PCT Filed: Sep. 25, 2014

(86) PCT No.: PCT/KR2014/008922
§ 371 (c)(1),
(2) Date: Jan. 28, 2015

(87) PCT Pub. No.: WO2015/046894
PCT Pub. Date: Apr. 2, 2015

(65) Prior Publication Data
US 2016/0013468 A1 Jan. 14, 2016

(30) Foreign Application Priority Data

Sep. 26, 2013 (KR) .................. 10-2013-0114245

(51) Int. Cl.
*H01M 4/04* (2006.01)
*H01M 2/16* (2006.01)
*H01M 10/04* (2006.01)

(52) U.S. Cl.
CPC ......... *H01M 4/0435* (2013.01); *H01M 2/168* (2013.01); *H01M 2/1686* (2013.01);
(Continued)

(58) Field of Classification Search
CPC .................................................... H01M 4/04
See application file for complete search history.

(56) References Cited

U.S. PATENT DOCUMENTS

2001/0036573 A1  11/2001  Jen et al.
2002/0160257 A1  10/2002  Lee et al.
(Continued)

FOREIGN PATENT DOCUMENTS

CN   101202365 A   6/2008
CN   101897058 A   11/2010
(Continued)

OTHER PUBLICATIONS

International Search Report issued in PCT/KR2014/008922, dated Jan. 8, 2015.
(Continued)

*Primary Examiner* — Daniel Lee
(74) *Attorney, Agent, or Firm* — Birch, Stewart, Kolasch & Birch, LLP

(57) ABSTRACT

Provided is a method of manufacturing an electrode assembly which is different from a stack folding method and a stack method. The method includes forming a unit structure, which comprises a stacked structure formed by sequentially stacking a first electrode, a first separator, a second electrode, and a second separator, or a structure formed by repeatedly forming the stacked structure a plurality of times (operation S10), forming the electrode assembly by repeatedly stacking the unit structure into a plurality of layers (operation S20), and discharging gas interposed between the layers by pressing the electrode assembly (operation S30).

16 Claims, 13 Drawing Sheets

(52) U.S. Cl.
CPC .... *H01M 10/0413* (2013.01); *H01M 10/0468* (2013.01); *H01M 2220/20* (2013.01)

(56) References Cited

U.S. PATENT DOCUMENTS

| | | |
|---|---|---|
| 2002/0160258 A1 | 10/2002 | Lee et al. |
| 2003/0013012 A1 | 1/2003 | Ahn et al. |
| 2011/0052964 A1 | 3/2011 | Kim et al. |
| 2011/0135996 A1* | 6/2011 | Ahn ............... H01M 2/145 |
| | | 429/162 |
| 2011/0274955 A1 | 11/2011 | Park et al. |
| 2012/0225345 A1* | 9/2012 | Kim ............... H01M 2/1653 |
| | | 429/145 |
| 2014/0134472 A1 | 5/2014 | Kim |
| 2014/0212729 A1 | 7/2014 | Park et al. |
| 2014/0212751 A1 | 7/2014 | Ku et al. |
| 2014/0349192 A1 | 11/2014 | Park et al. |
| 2014/0352138 A1 | 12/2014 | Yasooka et al. |
| 2014/0363725 A1 | 12/2014 | Park et al. |
| 2014/0363727 A1 | 12/2014 | Ko et al. |
| 2014/0370362 A1 | 12/2014 | Park et al. |
| 2015/0180082 A1 | 6/2015 | Jung et al. |

FOREIGN PATENT DOCUMENTS

| | | | |
|---|---|---|---|
| CN | 102884665 A | | 1/2013 |
| CN | 103098256 A | | 5/2013 |
| EP | 2757625 A1 | | 7/2014 |
| EP | 2772978 A1 | | 9/2014 |
| EP | 2808933 A1 | | 12/2014 |
| EP | 2866290 A1 | | 4/2015 |
| JP | 2001-357890 A | | 12/2001 |
| JP | 2003-523060 A | | 7/2003 |
| JP | 2006-185662 A | | 7/2006 |
| JP | 2008-166256 A | | 7/2008 |
| JP | 2009-295553 A | | 12/2009 |
| JP | 2009295553 A | * | 12/2009 |
| JP | 2013-524460 A | | 6/2013 |
| JP | 2013-165037 A | | 8/2013 |
| JP | 2015-526857 A | | 9/2015 |
| JP | 2015-527709 A | | 9/2015 |
| JP | 2015-531155 A | | 9/2015 |
| JP | 2015-532766 A | | 11/2015 |
| KR | 2001-0082058 A | | 8/2001 |
| KR | 2001-0082059 A | | 8/2001 |
| KR | 2001-0082060 A | | 8/2001 |
| KR | 10-0983047 B1 | | 9/2010 |
| KR | 10-2011-0063899 A | | 6/2011 |
| KR | 10-2011-0112241 A | | 10/2011 |
| KR | 10-2012-0117221 A | | 10/2012 |
| KR | 10-2013-0074242 A | | 7/2013 |

OTHER PUBLICATIONS

Written Opinion issued in PCT/KR2014/008922, dated Jan. 8, 2015.
Partial Supplementary European Search Report, dated Mar. 15, 2016, for European Application No. 14837058.8.
Chinese Office Action and Search Report dated Jun. 30, 2016, for Chinese Application No. 201480002526.1 with the English translation.
Extended European Search Report dated Jul. 26, 2016, for European Application No. 14837058.8 is provided.
Chinese Office Action dated Jun. 30, 2016, for Chinese Application No. 20148002526.1 with the English translation.

\* cited by examiner

METHOD OF MANUFACTURING ELECTRODE ASSEMBLY

TECHNICAL FIELD

The present invention relates to a method of manufacturing an electrode assembly which is different from a stack folding method and a stack method.

BACKGROUND ART

Secondary batteries are regarded with much interest as a power source of electric vehicles (EVs), hybrid electric vehicles (HEVs), and parallel hybrid electric vehicles (PHEVs), which are expected to reduce air pollution caused by typical gasoline and diesel vehicles using fossil fuels. Medium-to-large devices, such as vehicles, require high power and high capacity, and thus, employ a medium-to-large battery module that is formed by electrically connecting a large number of battery cells.

To optimally reduce the size and weight of medium-to-large battery modules, prismatic-type batteries and pouch-type batteries, which have high integration and a small weight-to-capacity ratio, are widely used as battery cells in medium-to-large battery modules.

An electrode assembly is accommodated in a case of a battery cell. Electrode assemblies may be classified according to types of structures including cathodes, separators, and anodes.

For example, electrode assemblies may be classified into jelly-roll (winding type) electrode assemblies having a structure formed by winding long sheet type cathodes and anodes with a separator therebetween, stacked type electrode assemblies formed by sequentially stacking a plurality of cathodes and anodes cut to a predetermined size with a separator therebetween, and stack and folding type electrode assemblies.

Stack and folding type electrode assemblies disclosed in Korean Patent Publication Nos. 2001-0082058, 2001-0082059, and 2001-0082060, applied by the applicant of the present invention, will now be described.

Referring to FIG. 1, an electrode assembly 1 having a stack and folding type structure includes: a plurality of full cells 1a, 1b, 2, 3, and 4, as unit cells, which are formed by sequentially stacking a cathode, a separator, and an anode and overlap one another; and a separator sheet 5 disposed between overlap parts of the full cells 1a, 1b, 2, 3, and 4. The separator sheet 5 has a unit length to surround a full cell and is bent inward by the unit length between the overlap parts to surround each full cell in a range from the full cell 1b disposed in the center of the electrode assembly 1 to the full cell 4 disposed on an outermost side of the electrode assembly 1. A distal end of the separator sheet 5 is finished by using heat welding or attaching an adhesive tape 6 thereto. Such stack and folding type electrode assemblies are manufactured, for example, by arraying the full cells 1a, 1b, 2, 3, and 4 on the separator sheet 5 having a long length and sequentially winding the full cells 1a, 1b, 2, 3, and 4 from an end of the separator sheet 5. However, under this structure, a temperature gradient is formed between the full cells 1a, 1b, and 2, disposed in the central region of the electrode assembly 1, and the full cells 3 and 4 disposed in outermost regions of the electrode assembly 1, and thus, heat dissipation efficiency varies therebetween, which decreases the service life of the electrode assembly 1 when being used for a long time.

A process of forming such electrode assemblies employs two lamination apparatuses for forming each of the electrode assemblies, and a separate folding apparatus. Thus, there is a limit in reducing a tact time of the process. Specifically, when a stacked structure is formed through folding, it is difficult to accurately align upper and lower electrode assemblies of the stacked structure, which makes it difficult to form an assembly having a reliable quality.

That is, a structure of electrode assemblies, to which such a folding process is applied, requires a separate folding apparatus. In addition, when a bi-cell structure is used, two types of bi-cells (that is, an A type bi-cell and C type bi-cell) are manufactured and stacked, and it is significantly difficult to accurately maintain a distance between bi-cells disposed on a long separator sheet before a folding process. That is, it is difficult to accurately align upper and lower unit cells (full cells or bi-cells) in a folding process. In addition, when a high capacity cell is manufactured, it takes a long time to change molds.

Next, stacked type electrode assemblies will now be described. Since stacked type structures are well known in the art, limitations of stacked type electrode assemblies will now be described briefly.

Horizontal and vertical widths of a separator of stacked type electrode assemblies may be greater than those of an electrode. Such a stacked type electrode assembly is manufactured by repeatedly performing a process of placing a separator on a magazine or jig having a width corresponding to the horizontal or vertical width of the separator, and placing an electrode on the separator.

However, in this case, electrodes and separators are stacked one by one, and thus, a working time is increased so as to significantly decrease productivity. While the separators can be horizontally and vertically aligned, there is no magazine or jig for accurately aligning the electrodes placed on the separators. Thus, electrodes of stacked type electrode assemblies may be misaligned.

Furthermore, since face-to-face surfaces of a cathode and an anode with a separator therebetween are misaligned from each other, an electrochemical reaction may not occur on one portion of active materials applied to the face-to-face surfaces, thus decreasing efficiency of a battery cell.

DISCLOSURE OF THE INVENTION

Technical Problem

Accordingly, the present invention aims at providing a method of manufacturing an electrode assembly having a structure that is economically manufactured through a simple process.

The present invention also aims at providing a method of manufacturing an electrode assembly in which electrodes are accurately arrayed to improve efficiency thereof.

The present invention also aims at providing an electrode assembly manufacturing method, which improves contact uniformity between layers of an electrode assembly, thereby improving structural stability and performance of the electrode assembly.

Technical Solution

According to an aspect of the present invention, there is provided a method of manufacturing an electrode assembly, the method including: forming a unit structure, which comprises a stacked structure formed by sequentially stacking a first electrode, a first separator, a second electrode, and a second separator, or a structure formed by repeatedly forming the stacked structure a plurality of times (operation S10); forming the electrode assembly by repeatedly stacking the unit structure into a plurality of layers (operation S20); and discharging gas interposed between the layers by pressing the electrode assembly (operation S30).

Advantageous Effects

According to the present invention, provided is a method of manufacturing an electrode assembly having a structure that is economically manufactured through a simple process.

Also, provided is a method of manufacturing an electrode assembly in which electrodes are accurately arrayed to improve efficiency thereof.

Also, provided is an electrode assembly manufacturing method, which improves contact uniformity between layers of an electrode assembly, thereby improving structural stability and performance of the electrode assembly.

BRIEF DESCRIPTION OF THE DRAWINGS

The above and other aspects, features and other advantages of the present invention will be more clearly understood from the following detailed description taken in conjunction with the accompanying drawings, in which.

MODE FOR CARRYING OUT THE INVENTION

Figure 1:
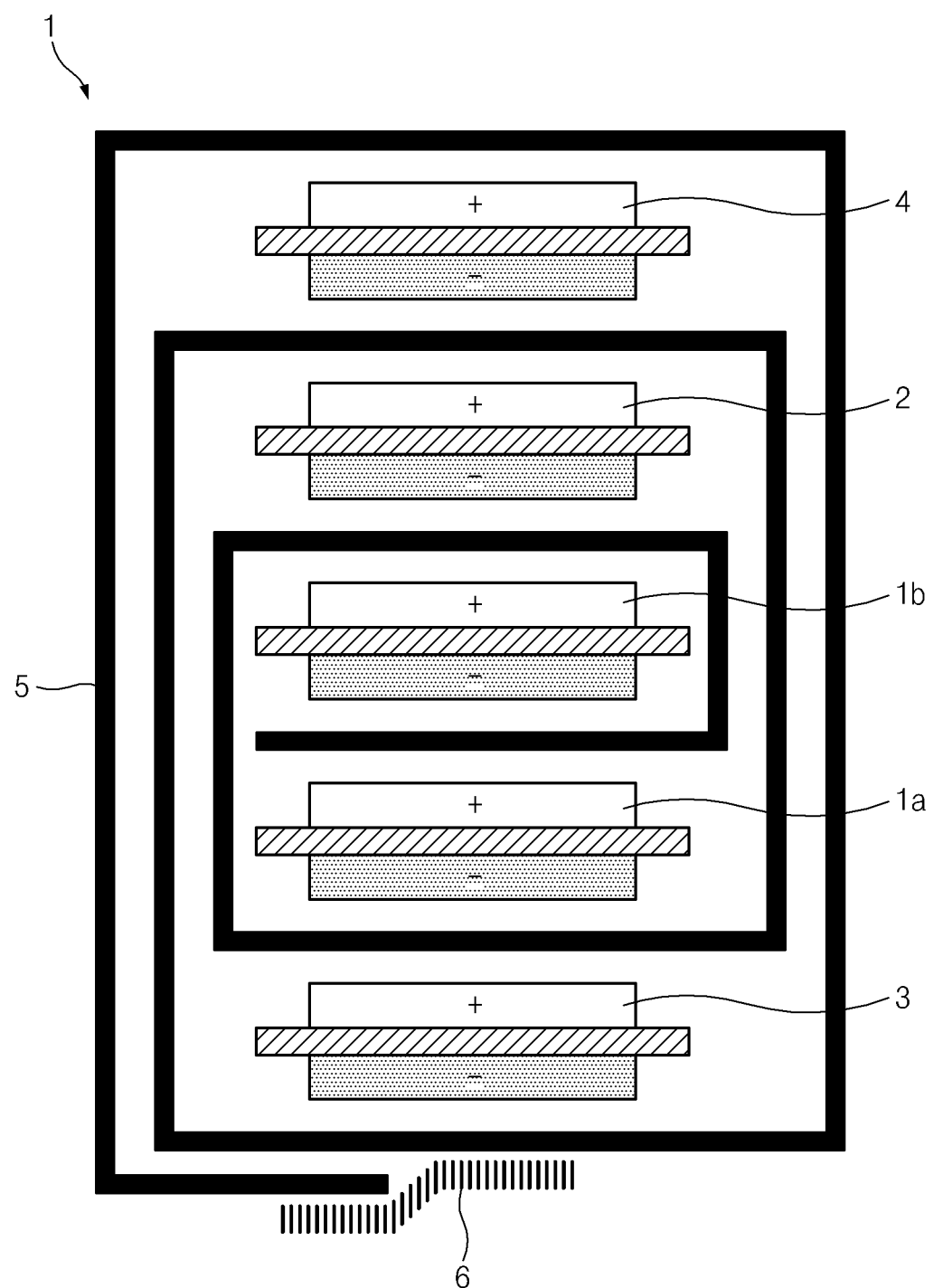
FIG. 1 is a schematic view illustrating a stack and folding type electrode assembly in the related art.

Hereinafter, preferred embodiments of the present invention will be described in detail with reference to the accompanying drawings. However, the present invention is not limited to the following embodiments.

Terms used in the following description and scopes of claims are not limited to terms that have been in dictionaries, and are used only for explaining specific exemplary embodiments while not limiting the present invention.

In the drawings, the size of each element or a specific part that constitutes the element is exaggerated, omitted, or schematically illustrated for convenience in description and clarity. Thus, the size of each element does not entirely reflect an actual size. Moreover, detailed descriptions related to well-known functions or configurations will be ruled out in order not to unnecessarily obscure subject matters of the present invention.

An electrode assembly manufacturing method according to a preferred embodiment of the present invention includes: forming a unit structure 110, which has a structure formed by sequentially stacking a first electrode 111, a first separator 112, a second electrode 113, and a second separators 114, or a structure formed by repeatedly forming the first structure a plurality of times (operation S10); forming an electrode assembly 100 by repeatedly stacking the unit structure 110 into a plurality of layers (operation S20); and discharging gas interposed between the layers by pressing the electrode assembly 100 (operation S30).

In operation S10, the unit structure 110 is formed through a laminating process using pressing, or a laminating process using pressing and heating. The laminating process may have a pressure ranging from about 800 kgf/cm$^2$ to about 1000 kgf/cm$^2$, and a temperature ranging from about 60° C. to about 80° C. As described above, the laminating process may use pressing and heating, or only pressing.

In operation S20, the unit structures 110 may be stacked into a plurality of layers, or auxiliary units 130 and 140 may be further stacked. In the electrode assembly manufacturing method according to the current embodiment, the electrode assembly 100 is completed by performing operation S30 on a stack of only the unit structures 110 formed in operation S20 or on a stack of the unit structures 110 and the auxiliary units 130 and 140 formed in operation S20. However, the appearance of the stack completed in operation S20 is the same as the appearance of the electrode assembly 100 completed in operation S30. Thus, the stack completed in operation S20 is also referred to as the electrode assembly 100 for convenience in description.

Before a detailed description of operation S30, detailed configurations of the unit structure 110 formed in operation S10, and exemplary structures of the electrode assembly 100 formed through a stacking process in operation S20 will now be described.

Figure 2:
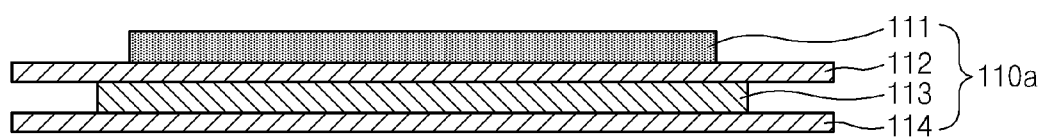
FIG. 2 is a side view illustrating a first structure of a unit structure of an electrode assembly manufactured using an electrode assembly manufacturing method according to the present invention.
Figure 3:
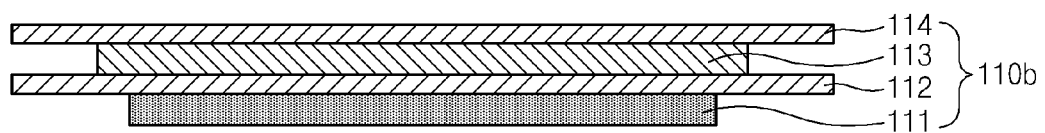
FIG. 3 is a side view illustrating a second structure of a unit structure of an electrode assembly manufactured using an electrode assembly manufacturing method according to the present invention.

An electrode assembly 100 manufactured using the electrode assembly manufacturing method according to the current embodiment includes one or more unit structures 110a and 110b (refer to FIGS. 2 and 3).

The unit structure 110 is formed by sequentially stacking the first electrode 111, the first separator 112, the second electrode 113, and the second separator 114. As such, the unit structure 110 basically has a four-layer structure. In more particular, referring to FIG. 2, the unit structure 110 may be formed by sequentially stacking the first electrode 111, the first separator 112, the second electrode 113, and the second separator 114 from the upper side of the unit structure 110 to the lower side thereof. Alternatively, referring to FIG. 3, the unit structure 110 may be formed by sequentially stacking the first electrode 111, the first separator 112, the second electrode 113, and the second separator 114 from the lower side of the unit structure 110 to the upper side thereof. The pole of the first electrode 111 is opposite to the pole of the second electrode 113. For example, when the first electrode 111 is a cathode, the second electrode 113 may be an anode, and vice versa.

The first electrode 111 of the unit structure 110 includes a collector and an active material layer (an active material) that is applied to both surfaces of the collector. In a same manner, the second electrode 113 of the unit structure 110 includes a collector and an active material layer (an active material) that is applied to both surfaces of the collector.

Figure 4:
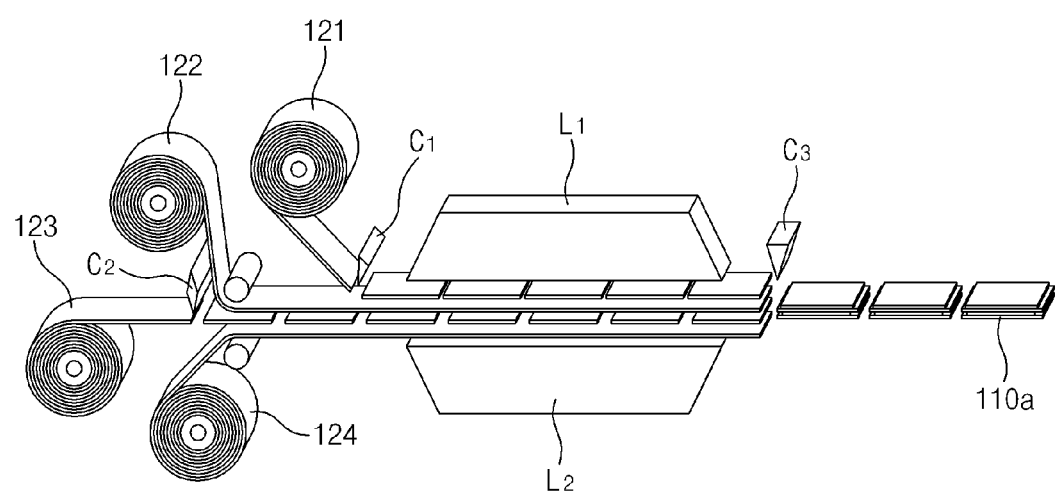
FIG. 4 is a view illustrating operation S10 of a method of manufacturing a unit structure according to an embodiment of the present invention.

Operation S10 may be a continuous process below (refer to FIG. 4). First, a first electrode raw material 121, a first separator raw material 122, a second electrode raw material 123, and a second separator raw material 124 are prepared. The first and second electrode raw materials 121 and 123 are cut to predetermined sizes to form the first and second electrodes 111 and 113, which will be described later. Such a manner is applied to the first and second separator raw materials 122 and 124. The first and second electrode raw materials 121 and 123 and the first and second separator raw materials 122 and 124 may be wound around rolls for process automation. After the first and second electrode raw materials 121 and 123 and the first and second separator raw materials 122 and 124 are prepared, the first electrode raw material 121 is cut to the predetermined size using a cutter C1. The second electrode raw material 123 is also cut to the predetermined size using a cutter C2. After that, the first electrode raw material 121 having the predetermined size is supplied onto the first separator raw material 122. The second electrode raw material 123 having the predetermined size is supplied onto the second separator raw material 124. After that, the first and second electrode raw materials 121 and 123 and the first and second separator raw materials 122 and 124 are supplied together to laminators L1 and L2.

The electrode assembly 100 is formed by repeatedly stacking the unit structure 110, as described above. However, if the first electrode 111, the first separator 112, the second electrode 113, and the second separator 114, which constitute the unit structure 110, are separated from one another, it is significantly difficult to repeatedly stack the unit structure 110. Thus, the first electrode 111, the first separator 112, the second electrode 113, and the second separator 114, which constitute the unit structure 110, may be adhered to one another. To this end, the laminators L1 and L2 are used. That is, the laminators L1 and L2 press electrode raw materials and separator raw materials, or heat and press the electrode raw materials and the separator raw materials to adhere the electrode raw materials and the separator raw materials to one another. As such, electrode raw materials and separator raw materials are adhered to one another through a laminating process by the laminators L1 and L2. Such an adhering process makes the unit structure 110 more stably maintain the shape thereof.

After laminating the first and second electrode raw materials 121 and 123 and the first and second separator raw materials 122 and 124, the first separator raw material 122 and the second separator raw material 124 are cut to a predetermined size using a cutter C3. Accordingly, the unit structure 110 may be formed. Additionally, various inspections may be optionally performed on the unit structure 110. For example, a thickness inspection, a vision inspection, and a short circuit inspection may be additionally performed.

Operation S10 may be the continuous process as described above, and may not be the continuous process. That is, the first and second electrodes 111 and 113 and the first and second separators 112 and 114 may be cut to appropriate sizes and be then stacked to form the unit structure 110.

Surfaces of the first and second separators 112 and 114 or the first and second separator raw materials 122 and 124 may be coated with coating materials having adhesive force. The coating material may be a mixture of inorganic particles and a binder polymer. The inorganic particles may improve thermal stability of a separator. That is, the inorganic particles may prevent the separator from contracting at a high temperature. The binder polymer may immobilize the inorganic particles, and thus, a predetermined porous structure may be formed between the inorganic particles immobilized within the binder polymer. Although the separator is coated with the inorganic particles, ions may efficiently move from a cathode to an anode through the porous structure. The binder polymer stably fixes the inorganic particles to the separator to improve mechanical stability of the separator. In addition, the binder polymer may more efficiently adhere the separator to an electrode. For reference, the separator may be formed of a polyolefin-based separator base material.

Referring to FIGS. 2 and 3, the first and second electrodes 111 and 113 are disposed on both surfaces of the first separator 112, and the second electrode 113 is disposed on a surface of the second separator 114. Thus, both the surfaces of the first separator 112 may be coated with a coating material, and only the surface of the second separator 114 may be coated with a coating material. That is, both the surfaces of the first separator 112, which face the first and second electrodes 111 and 113, may be coated with a coating material, and only the surface of the second separator 114, which faces the second electrode 113, may be coated with a coating material.

As such, an adhering process using coating materials may be performed on only the inside of the unit structure 110. Thus, only one surface of the second separator 114 may be coated as described above. However, both surfaces of the second separator 114 may also be optionally coated since the unit structures 110 may be adhered to each other using a method such as heat press. That is, the surface of the second separator 114 facing the second electrode 113, and the opposite surface of the second separator 114 thereto may be coated with a coating material. In this case, a unit structure 110 disposed at the upper side of the second separator 114 may be adhered to another unit structure 110 disposed directly under the first unit structure 110 by the coating material formed on both the surfaces of the second separator 114.

For reference, when a coating material having adhesive force is applied to a separator, it may be undesirable that a predetermined element directly presses the separator. The separator may be extended outward to be longer than electrodes. Thus, a distal end of the first separator 112 may be coupled to a distal end of the second separator 114. For example, a distal end of the first separator 112 may be welded to a distal end of the second separator 114 through ultrasonic welding. Such ultrasonic welding requires direct pressing an object with a horn. However, as such, when a horn directly presses a distal end of a separator, the horn may be adhered to the separator by a coating material having adhesive force, which may cause device trouble. Thus, when a coating material having adhesive force is applied to a separator, a process of directly pressing the separator with a predetermined element may be undesirable.

Additionally, the unit structure 110 may not have the four-layer structure. For example, the unit structure 110 may have an eight-layer structure formed by sequentially stacking the first electrode 111, the first separator 112, the second electrode 113, the second separator 114, the first electrode 111, the first separator 112, the second electrode 113, and the second separator 114. That is, the unit structure 110 may have a structure formed by repeatedly stacking the four-layer structure. The electrode assembly 100 is formed by repeatedly stacking the unit structure 110, as described above. Thus, the electrode assembly 100 may be formed by repeatedly stacking the four-layer structure or, for example, the eight-layer structure.

The electrode assembly 100 may further include at least one of a first auxiliary unit 130 and a second auxiliary unit 140. First, the first auxiliary unit 130 will now be described. The unit structure 110 is formed by sequentially stacking the first electrode 111, the first separator 112, the second electrode 113, and the second separator 114 from the upper side of the unit structure 110 to the lower side, or from the lower side of the unit structure 110 to the upper side. Thus, when the electrode assembly 100 is formed by repeatedly stacking the unit structure 110, the first electrode 111 (116, which is referred to as "a first distal end electrode" hereinafter) is disposed on the uppermost (refer to FIG. 2) or lowermost side (refer to FIG. 3) of the electrode assembly 100 (the first distal end electrode may be a cathode or an anode). The first auxiliary unit 130 is additionally disposed as a layer on the first distal end electrode 116.

Figure 5:
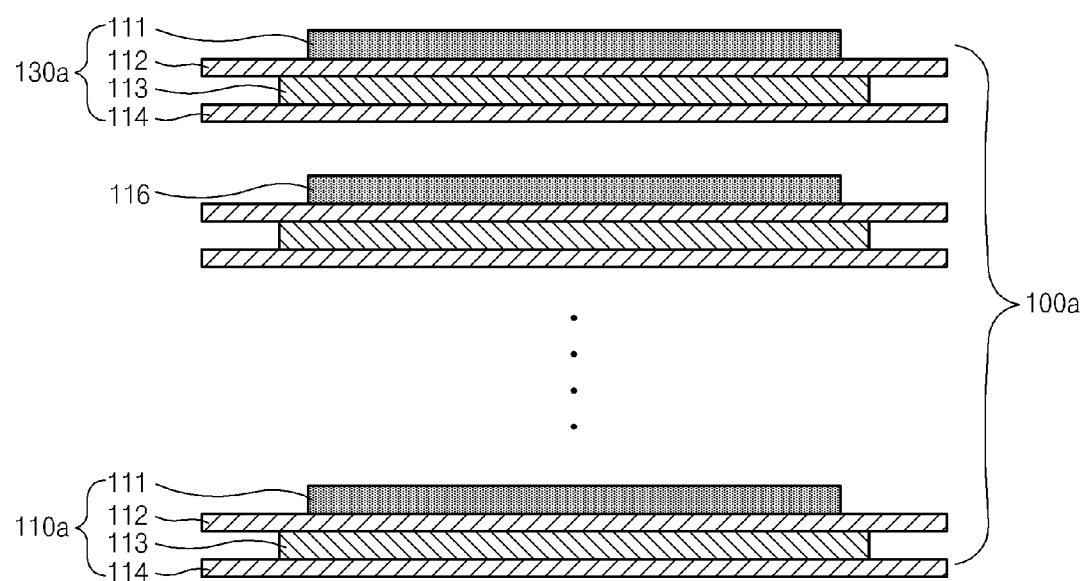
FIG. 5 is a side view illustrating a first structure of an electrode assembly including unit structures and a first auxiliary unit.
Figure 6:
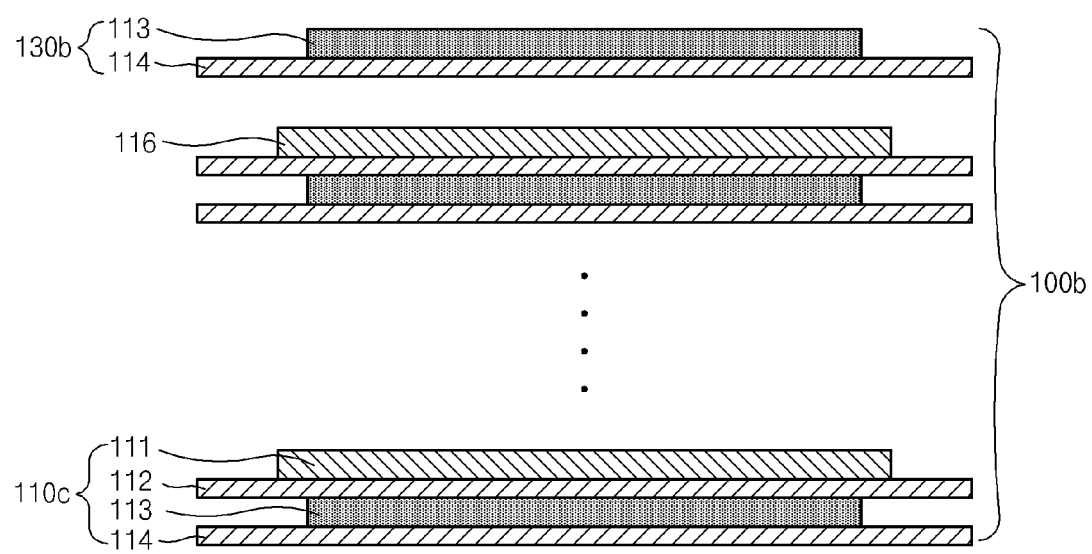
FIG. 6 is a side view illustrating a second structure of an electrode assembly including unit structures and a first auxiliary unit.

In more particular, referring to FIG. 5, when a first electrode 111 is a cathode and a second electrode 113 is an anode, a first auxiliary unit 130a may be formed by sequentially stacking a separator 114, an anode 113, a separator 112, and a cathode 111 from a first distal end electrode 116, that is, outwardly from the first distal end electrode 116 (to the upper side of FIG. 5). In addition, referring to FIG. 6, when a first electrode 111 is an anode and a second electrode 113 is a cathode, a first auxiliary unit 130b may be formed by sequentially stacking a separator 114 and a cathode 113 from a first distal end electrode 116, that is, outwardly from the first distal end electrode 116. Referring to FIG. 5 or 6, a cathode may be disposed on an outermost side of the electrode assembly 100 adjacent to the first distal end electrode 116, by using the first auxiliary unit 130.

An electrode may include a collector and an active material layer (an active material) that is applied to both surfaces of the collector. Accordingly, referring to FIG. 5, an active material layer of a cathode disposed under a collector reacts with an active material layer of an anode disposed above a collector, through a separator. When unit structures 110 are formed in the same manner and are then sequentially stacked to form an electrode assembly 100, both surfaces of a collector of a first distal end electrode disposed on the uppermost or lowermost side of the electrode assembly 100 are provided with active material layers, like first electrodes 111. However, in this case, the active material layer of the first distal end electrode disposed at an outside of the electrode assembly 100 does not react with another active material layer, which causes a waste of active material layers.

Such an issue is addressed using the first auxiliary unit 130. That is, the first auxiliary unit 130 is formed separately from the unit structures 110. Thus, the first auxiliary unit 130 may include a cathode having a collector, only a surface of which is coated with an active material. That is, a cathode of the first auxiliary unit 130 may include a collector, and only one surface of the collector facing the unit structures 110 (only a surface facing the lower side of FIG. 5) may be coated with an active material layer. As a result, when a first auxiliary unit 130 is disposed on a first distal end electrode 116 to form an electrode assembly 100, a cathode, only one surface of which is coated, may be disposed on an outermost side of the first distal end electrode 116, thus preventing a waste of active material layers. In addition, since a cathode is a configuration for discharging, for example, nickel ions, when the cathode is disposed on the outermost side of an electrode assembly, battery capacity is improved.

Next, the second auxiliary unit 140 will now be described. The second auxiliary unit 140 basically performs the same function as that of the first auxiliary unit 130. In more particular, a unit structure 110 is formed by sequentially stacking a first electrode 111, a first separator 112, a second electrode 113, and a second separator 114 from the upper side of the unit structure 110 to the lower side, or from the lower side of the unit structure 110 to the upper side. Thus, when an electrode assembly 100 is formed by repeatedly stacking the unit structure 110, the second separator 114 (117, which is referred to as "a second distal end separator" hereinafter) is disposed on the uppermost (refer to FIG. 3) or lowermost side (refer to FIG. 2) of the electrode assembly 100. The second auxiliary unit 140 is additionally disposed as a layer on the second distal end separator 117.

Figure 7:
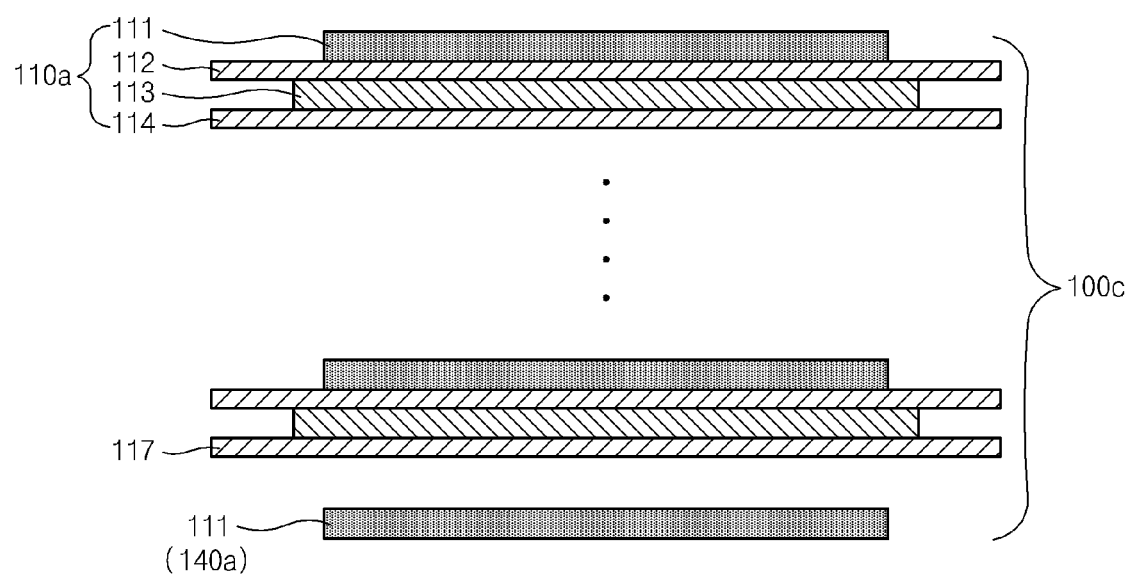
FIG. 7 is a side view illustrating a third structure of an electrode assembly including unit structures and a second auxiliary unit.
Figure 8:
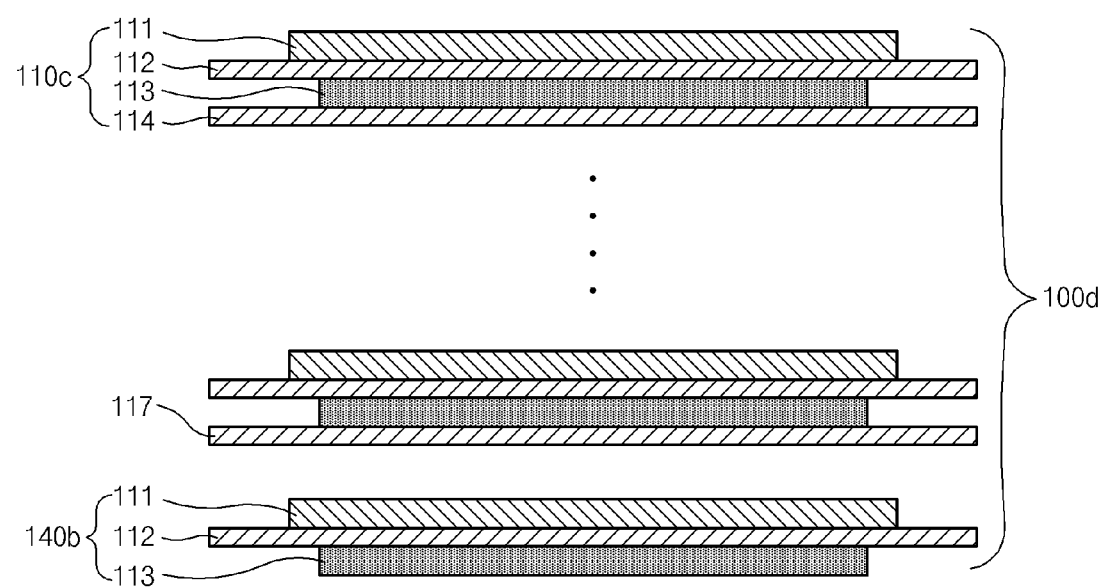
FIG. 8 is a side view illustrating a fourth structure of an electrode assembly including unit structures and a second auxiliary unit.

In more particular, referring to FIG. 7, when a first electrode 111 is a cathode, and a second electrode 113 is an anode, a second auxiliary unit 140a may be formed as a cathode 111. In addition, referring to FIG. 8, when a first electrode 111 is an anode and a second electrode 113 is a cathode, a second auxiliary unit 140b may be formed by sequentially stacking an anode 111, a separator 112, and a cathode 113 from a second distal end separator 117, that is, outwardly from the second distal end separator 117 (to the lower side of FIG. 8). Like the first auxiliary unit 130, a cathode of the second auxiliary unit 140 may include a collector, and only one surface of the collector facing the unit structures 110 (only a surface facing the upper side of FIG. 8) may be coated with an active material layer. As a result, when a second auxiliary unit 140 is disposed on a second distal end separator 117 to form an electrode assembly 100, a cathode, only one surface of which is coated, may be disposed on an outermost side of the second distal end separator 117.

For reference, referring to FIGS. 5 to 8, a first electrode 111, a first separator 112, a second electrode 113, and a second separator 114 are sequentially stacked from the upper side to the lower side thereof. On the contrary, a first electrode 111, a first separator 112, a second electrode 113, and a second separator 114 may be sequentially stacked from the lower side to the upper side thereof, and the foregoing description can be applied to this case. The first auxiliary unit 130 and the second auxiliary unit 140 may further include a separator on an outermost side thereof, if necessary. For example, when a cathode disposed on the outermost side of the first auxiliary unit 130 and the second auxiliary unit 140 is needed to be electrically insulated from a case, the first auxiliary unit 130 and the second auxiliary unit 140 may further include a separator on an outermost side of the cathode. For a same reason, referring to FIG. 7, a separator may be further provided on a cathode exposed on a side of an electrode assembly 100 opposite to a second auxiliary unit 140 (that is, on the uppermost side of the electrode assembly 100 as illustrated in FIG. 7).

Figure 9:
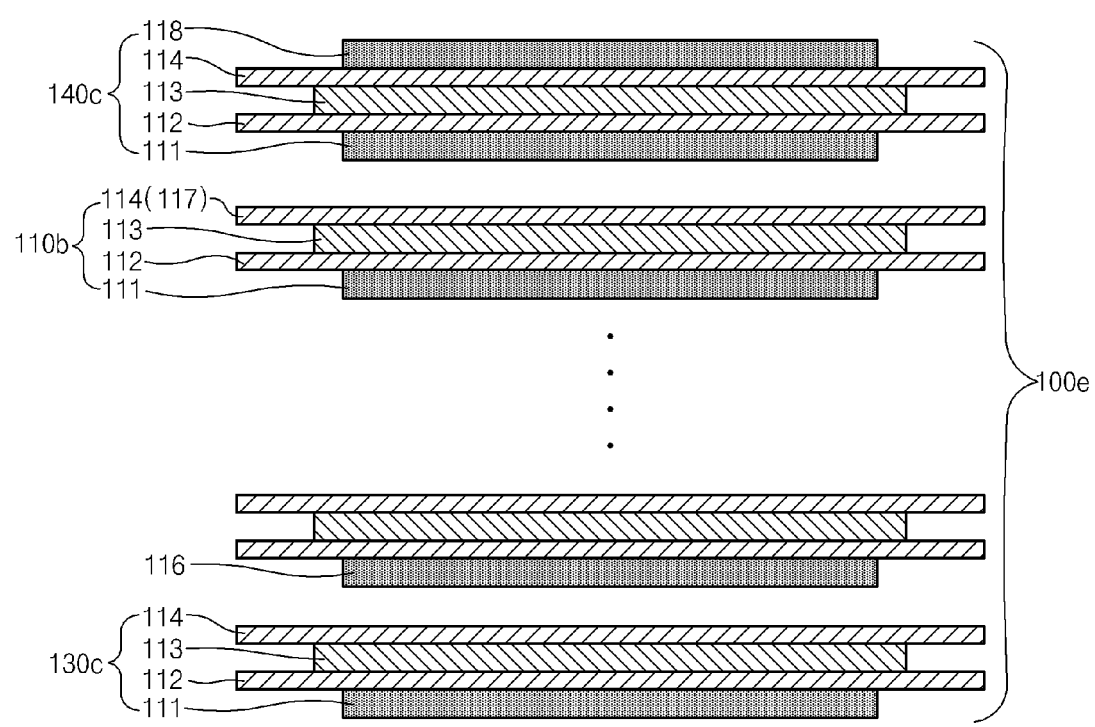
FIG. 9 is a side view illustrating a fifth structure of an electrode assembly including unit structures and first and second auxiliary units.
Figure 10:
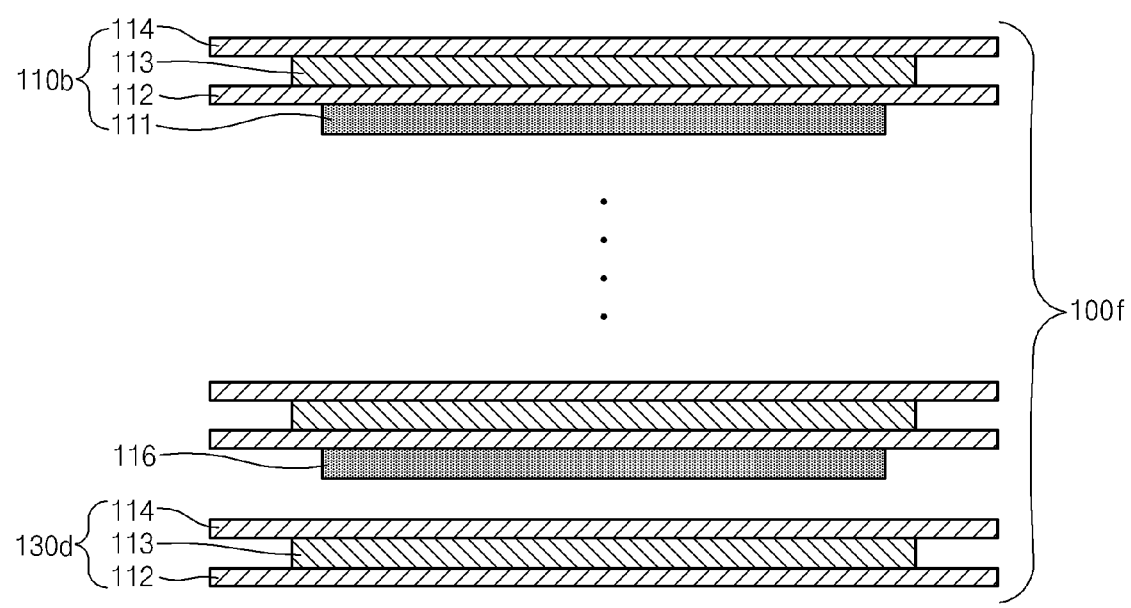
FIG. 10 is a side view illustrating a sixth structure of an electrode assembly including unit structures and a first auxiliary unit.
Figure 11:
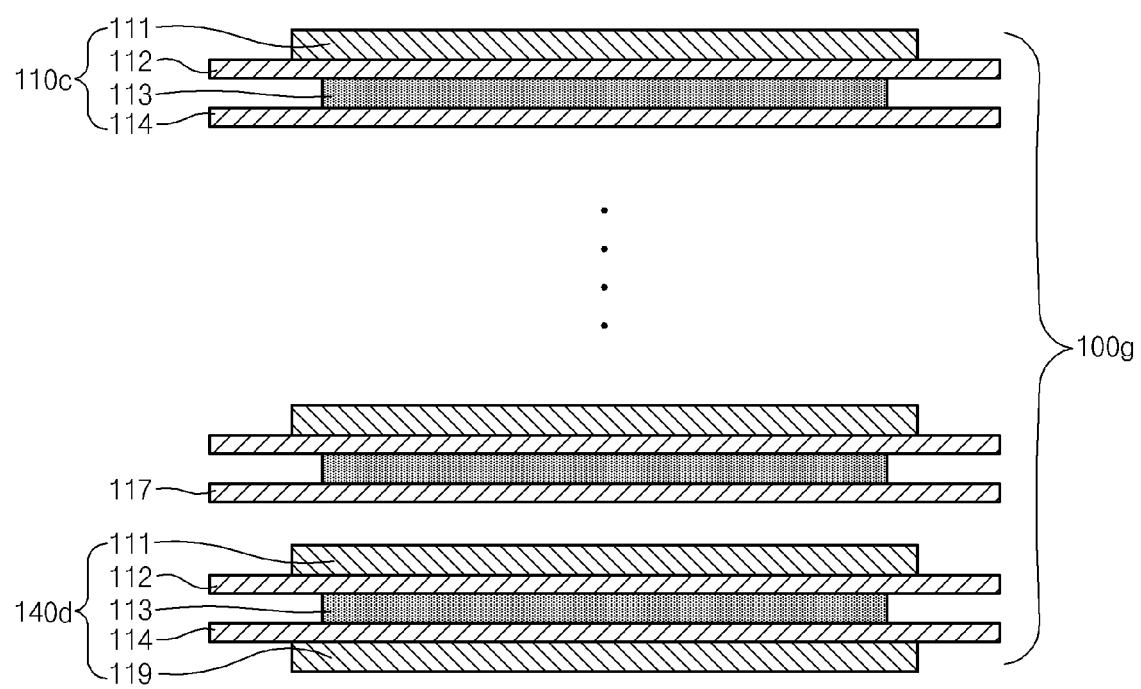
FIG. 11 is a side view illustrating a seventh structure of an electrode assembly including unit structures and a second auxiliary unit.

Referring to FIGS. 9 to 11, an electrode assembly 100 may be formed. First, referring to FIG. 9, an electrode assembly 100e may be formed. A unit structure 110b may be formed by sequentially stacking a first electrode 111, a first separator 112, a second electrode 113, and a second separator 114 from the lower side of the unit structure 110b to the upper side thereof. The first electrode 111 may be a cathode, and the second electrode 113 may be an anode. A first auxiliary unit 130c may be formed by sequentially stacking a separator 114, an anode 113, a separator 112, and a cathode 111 from a first distal end electrode 116, that is, from the upper side of FIG. 9 to the lower side thereof. An active material layer may be formed on only a surface of the cathode 111 of the first auxiliary unit 130c facing the unit structure 110b.

A second auxiliary unit 140c may be formed by sequentially stacking a cathode 111 (a first cathode), a separator 112, an anode 113, a separator 114, and a cathode 118 (a second cathode) from a second distal end separator 117, that is, from the lower side of FIG. 9 to the upper side thereof. The cathode 118 (the second cathode) of the second auxiliary unit 140c, which is disposed an outermost side thereof, may include an active material layer on only a surface facing the unit structure 110b. For reference, an auxiliary unit including a separator facilitates alignment of units.

Next, referring to FIG. 10, an electrode assembly 100f may be formed. A unit structure 110b may be formed by sequentially stacking a first electrode 111, a first separator 112, a second electrode 113, and a second separator 114 from the lower side of the unit structure 110b to the upper side thereof. The first electrode 111 may be a cathode, and the second electrode 113 may be an anode. A first auxiliary unit 130d may be formed by sequentially stacking a separator 114, an anode 113, and a separator 112 from a first distal end electrode 116. In this case, a second auxiliary unit may not be provided. For reference, an anode may react with an aluminum layer of a battery case (for example, a pouch) due to a potential difference therebetween. Thus, the anode may be insulated from the battery case by a separator.

Finally, referring to FIG. 11, an electrode assembly 100g may be formed. A unit structure 110c may be formed by sequentially stacking a first electrode 110, a first separator 112, a second electrode 113, and a second separator 114 from the upper side of the unit structure 110c to the lower side thereof. The first electrode 111 may be an anode, and the second electrode 113 may be a cathode. A second auxiliary unit 140d may be formed by sequentially stacking an anode 111, a separator 112, a cathode 113, a separator 114, and an anode 119 from a second distal end separator 117. In this case, a first auxiliary unit may not be provided.

Hereinafter, operation S30, in which the electrode assembly 100 completed in operation S20 is pressed to discharge gas interposed between the unit structures 110 or gas interposed between the unit structure 110 and the auxiliary units 130 and 140, will now be described in detail.

Figure 12:
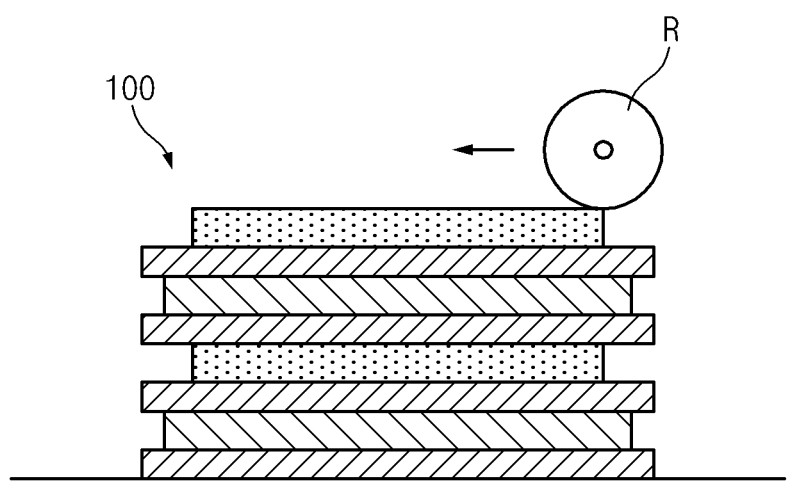
FIG. 12 is a side view illustrating an electrode assembly on which operation S30 is performed using a roll type press.
Figure 13:
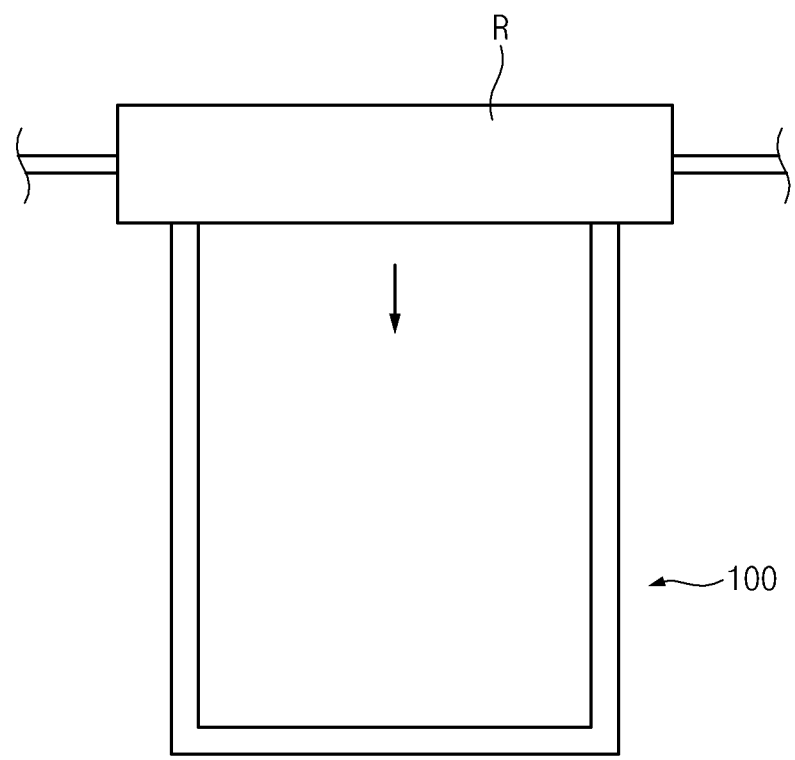
FIG. 13 is a plan view illustrating the electrode assembly of FIG. 12.

Referring to FIGS. 12 and 13, operation S30 may be performed by a roll type press R. When the unit structure 110 is formed in operation S10, sufficient pressure is applied to the first electrode 111, the first separator 112, the second electrode 113, and the second separator 114. Thus, when excessively high pressure is applied to the electrode assembly 100 in operation S30, the electrode assembly 100 may be structurally damaged.

Hence, pressure lower than that in operation S10 may be applied to the electrode assembly 100 in operation S30. Specifically, a pressure ranging from about 500 kgf/cm$^2$ to about 700 kgf/cm$^2$ may be applied to the electrode assembly 100.

Operation S30 may further include a process of heating the electrode assembly 100. In this case, the electrode assembly 100 may be heated at a temperature lower than a temperature of heat applied to each of the unit structures 110 in operation S10, in order to maintain performance of separators. Specifically, the electrode assembly 100 may be heated at a temperature ranging from about 45° C. to about 55° C. in operation S30.

When the electrode assembly 100 is pressed to discharge gas in operation S30, a press having a plate shape may press the electrode assembly 100. In this case, the gas may be inefficiently discharged to the outside from the spaces between the layers constituting the electrode assembly 100 and remain therein. Thus, contact uniformity may be degraded between an electrode and a separator, and the electrode assembly 100 may be susceptible to external vibration. Furthermore, the service life of a secondary battery may be decreased.

Thus, referring to FIGS. 12 and 13, the roll type press R presses an end part of the upper surface of the electrode assembly 100 and moves to another end part thereof in operation S30, thereby discharging the gas interposed between the layers of the electrode assembly 100.

Figure 14:
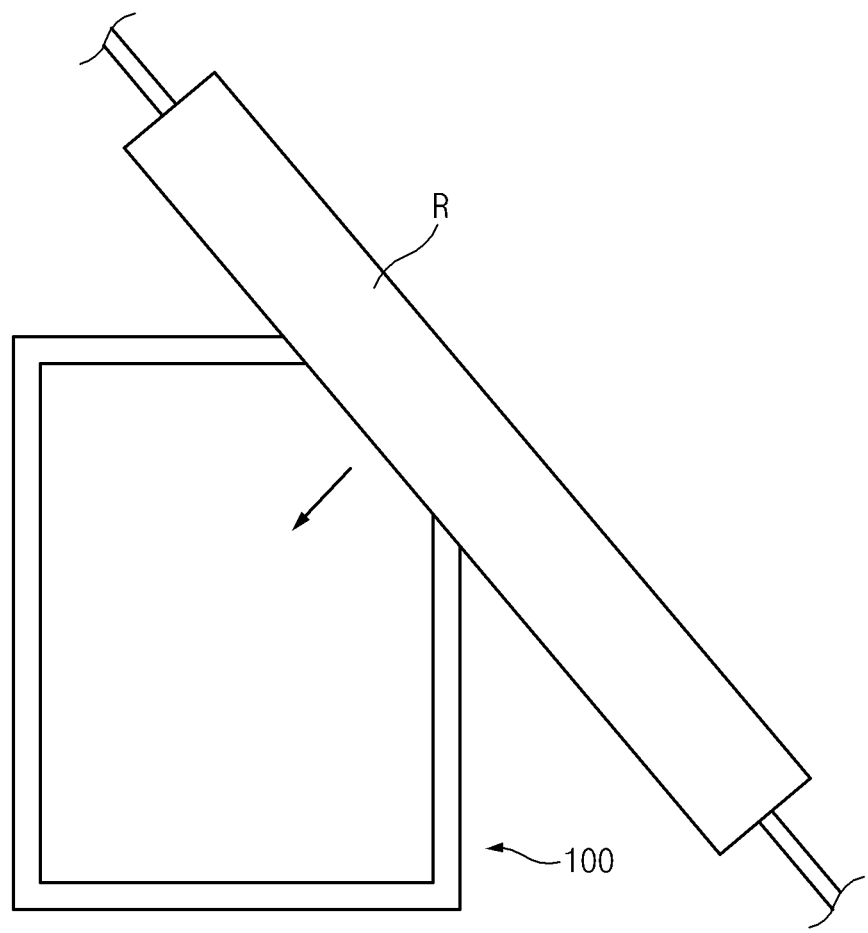
FIG. 14 is a plan view illustrating an electrode assembly on which a modification of operation S30 is performed.

In addition, referring to FIG. 14, the roll type press R presses a vertex disposed at an end part of the upper surface of the electrode assembly 100 and moves to a vertex diagonally opposite to the first vertex and disposed at another end part thereof in operation S30, thereby discharging the gas interposed between the layers of the electrode assembly 100.

As such, when the roll type press R pushes the gas in a specific direction from the spaces between the layers of the electrode assembly 100, the gas is efficiently discharged from the electrode assembly 100. In addition, contact uniformity between the layers of the electrode assembly 100 is improved, and structural stability and performance of the electrode assembly 100 are also improved.

While the present invention has been particularly shown and described with reference to exemplary embodiments and drawings thereof, it will be understood by those of ordinary skill in the art that various modifications and changes in form and details may be made therein without departing from the spirit and scope of the present invention as defined by the following claims.

The invention claimed is:

1. A method of manufacturing an electrode assembly which comprises electrodes and separators, the method comprising:
   forming a unit structure, which comprises a stacked structure formed by sequentially stacking a first electrode, a first separator, a second electrode, and a second separator, or a structure formed by repeatedly forming the stacked structure a plurality of times (operation S10);
   forming the electrode assembly by repeatedly stacking the unit structure into a plurality of layers (operation S20); and
   discharging gas interposed between the layers by pressing the electrode assembly (operation S30),
   wherein a surface of each of the first separator and second separator is coated with a coating material having adhesive force,
   wherein the unit structure is formed by adhering the first electrode, the first separator, the second electrode and the second separator,
   wherein operation S30 is performed using a roll press, which presses an electrode disposed at the outermost position of the electrode assembly, wherein the electrode assembly is supported on a support surface and the roll press moves across a top surface of the electrode assembly by moving in a plane having the top surface of the electrode assembly, and wherein the roll press presses a first vertex disposed at an end part of an upper surface of the electrode assembly and moves to a second vertex diagonally opposite to the first vertex and disposed at another end part thereof, thereby discharging the gas interposed between the layers of the electrode assembly.

2. The method of claim 1, wherein the unit structure is formed through a laminating process using pressing in operation S10.

3. The method of claim 2, wherein the laminating process has a pressure ranging from 800 kgf/cm$^2$ to 1000 kgf/cm$^2$.

4. The method of claim 1, wherein the unit structure is formed through a laminating process using pressing and heating in operation S10.

5. The method of claim 4, wherein the laminating process has a temperature ranging from 60° C. to 80° C.

6. The method of claim 1, wherein operation S30 further comprises a process of heating the electrode assembly.

7. The method of claim 6, wherein a pressure applied to the electrode assembly in operation S30 ranges from 500 kgf/cm$^2$ to 700 kgf/cm$^2$.

8. The method of claim 6, wherein a temperature applied to the electrode assembly in operation S30 ranges from 45° C. to 55° C.

9. The method of claim 1, wherein the coating material comprises a mixture of inorganic particles and a binder polymer.

10. The method of claim 1, wherein both surfaces of the first separator facing the first electrode and the second electrode are coated with the coating material, and only a surface of the second separator facing the second electrode is coated with the coating material.

11. The method of claim 1, wherein the electrode assembly further comprises a first auxiliary unit disposed as a layer on a first distal end electrode as the first electrode disposed on the uppermost or lowermost side of the electrode assembly, and when the first electrode is a cathode, and the second electrode is an anode, the first auxiliary unit is formed by sequentially stacking a separator, an anode, a separator, and a cathode from the first distal end electrode, and when the first electrode is an anode, and the second electrode is a cathode, the first auxiliary unit is formed by sequentially stacking a separator and a cathode from the first distal end electrode.

12. The method of claim 11, wherein the cathode of the first auxiliary unit comprises:
a collector; and
a cathode active material applied to only one surface of both surfaces of the collector, the one surface facing the unit structure.

13. The method of claim 1, wherein the electrode assembly further comprises a second auxiliary unit disposed as a layer on a second distal end separator as the second separator disposed on the uppermost or lowermost side of the electrode assembly, and when the first electrode is a cathode, and the second electrode is an anode, the second auxiliary unit is formed as a cathode, and when the first electrode is an anode, and the second electrode is a cathode, the second auxiliary unit is formed by sequentially stacking an anode, a separator, and a cathode from the second distal end separator.

14. The method of claim 13, wherein the cathode of the second auxiliary unit comprises:
a collector; and
a cathode active material applied to only one surface of both surfaces of the collector, the one surface facing the unit structure.

15. The method of claim 1, wherein the electrode assembly further comprises a second auxiliary unit disposed as a layer on a second distal end separator as the second separator disposed on the uppermost or lowermost side of the electrode assembly, and when the first electrode is a cathode, and the second electrode is an anode, the second auxiliary unit is formed by sequentially stacking a first cathode, a separator, an anode, a separator, and a second cathode from the second distal end separator, and the second cathode of the second auxiliary unit comprises a collector and a cathode active material applied to only one surface of both surfaces of the collector, the one surface facing the unit structure.

16. The method of claim 1, wherein the electrode assembly further comprises a second auxiliary unit disposed as a layer on a second distal end separator as the second separator disposed on the uppermost or lowermost side of the electrode assembly, and when the first electrode is an anode, and the second electrode is a cathode, the second auxiliary unit is formed by sequentially stacking an anode, a separator, a cathode, a separator, and an anode from the second distal end separator.

* * * * *